(12) United States Patent
Helbing et al.

(10) Patent No.: US 6,519,012 B1
(45) Date of Patent: Feb. 11, 2003

(54) LIQUID CRYSTAL LIGHT VALVE SYSTEM WITH CONTRAST CONTROL

(75) Inventors: Rene P. Helbing, Palo Alto, CA (US); Akinobu Kuramoto, Pleasanton, CA (US); Geraint Owen, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/429,588

(22) Filed: Oct. 28, 1999

(51) Int. Cl.[7] .............................................. G02F 1/135
(52) U.S. Cl. .......................... 349/30; 345/101; 345/94; 345/97; 345/102; 349/72; 349/161
(58) Field of Search .......................... 349/72, 161, 100; 345/101, 94, 102, 97

(56) References Cited

U.S. PATENT DOCUMENTS 5,825,344 A * 10/1998 Hughes et al. ............... 345/101
6,115,091 A * 9/2000 Kondoh et al. ................ 349/72

* cited by examiner

*Primary Examiner*—Kenneth Parker
*Assistant Examiner*—David Chung

(57) ABSTRACT

A ferroelectric liquid crystal-based light valve system with contrast control and a method for controlling contrast in a ferroelectric liquid crystal-based light valve system. The light valve system includes a light input, a ferroelectric liquid crystal-based spatial light modulator, an analyzer, and a voltage controller. The ferroelectric liquid crystal-based spatial light modulator includes signal processing electronics and an array of pixels. The array of pixels is configured to receive light from the light input and includes an array of pixel electrodes, a transparent electrode, and a layer of ferroelectric liquid crystal material. Each pixel electrode is independently switchable between a first voltage level and a second voltage level by the signal processing electronics. One of these levels may be a variable input voltage level. The analyzer has orthogonal directions of maximum transmissivity and minimum transmissivity. The voltage controller is configured to adjust at least one of the first voltage level and the second voltage level through a first range of voltages and a second range of voltages, respectively. As the voltage controller adjust the variable input voltage level, the direction of polarization of light exiting the pixels may rotate by at least 2 degrees in order to precisely align the direction of polarization with the direction of minimum transmissivity. The light valve system may further comprise a light intensity sensor and a feedback circuit in electrical communication with the light intensity sensor and the voltage controller. The method of controlling contrast in a ferroelectric light valve system begins by providing a ferroelectric liquid crystal-based spatial light modulator that includes a plurality of pixels and signal processing electronics. The signal processing electronics independently switch an electric field across each of the plurality of pixels between a forward direction and a reverse direction. An analyzer having a direction of minimum transmissivity is also provided. The pixels are then illuminated and a contrast control signal is detected. Detecting the control signal may include checking for an input from a contrast control user interface. Detecting the control signal may also include providing an automatic contrast control feedback circuit. The second direction of polarization is then rotated by changing the magnitude of the electric field across the plurality of pixels in response to the control signal.

19 Claims, 13 Drawing Sheets

LIQUID CRYSTAL LIGHT VALVE SYSTEM WITH CONTRAST CONTROL

FIELD OF THE INVENTION

The invention relates to liquid crystal-based light valve systems such as those used in video displays and in particular relates to contrast control in such light valve systems.

BACKGROUND OF THE INVENTION

A need exists for various types of video and graphics display devices with improved performance and lower cost. For example, a need exists for miniature video and graphics display device at are small enough to be integrated into a helmet or a pair of glasses so that they an be worn by the user. Such wearable display devices would replace or supplement the conventional displays of computers and other devices. A need also exists replacement for the conventional cathode-ray tube (CRT) used in many display devices including computer monitors, conventional and high-definition television receivers and large-screen displays. Both of these needs can be satisfied by display Crevices that incorporate a light valve system that uses as its light control element one or more spatial light modulators based on liquid crystal material.

Liquid crystal-based spatial light modulators are available in either a transmissive form or in a reflective form. The transmissive spatial light modulator is composed of a layer of a liquid crystal material sandwiched between two transparent electrodes. The liquid crystal material is preferably ferroelectric type. One of the electrodes is segmented into an array of pixel electrodes to define the picture elements (pixels) of the transmissive spatial light modulator. The direction of an electric field applied between each pixel electrode and the other electrode determines whether or not the corresponding pixel of the transmissive spatial light modulator rotates the direction of polarization of light falling on the pixel. The transmissive spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel.

Reflective spatial light modulators are similar in construction to transmissive spatial light modulators, but use reflective pixel electrodes and have the advantage that they do not require a transparent substrate. Accordingly, reflective spatial light modulators can be built on a silicon substrate that also accommodates the signal processing electronics that derive the drive signals for the pixel electrodes from the input video signal. A reflective spatial light modulator has the advantage that its pixel electrode drive circuits do not partially occlude the light modulated by the pixel. This enables a reflective spatial light modulator to have a greater light throughput than a similar-sized transmissive spatial light modulator and allows larger and more sophisticated drive circuits as well as the signal processing electronics to be incorporated.

As with the transmissive spatial light modulators, the direction of an electric field (in this case between the transparent electrode and the reflective electrode) determines whether or not the corresponding pixel of the reflective spatial light modulator rotates through 90° the direction of polarization of the light falling on (and reflected by) by the pixel. Thus, the polarized light reflected by the pixels of the reflective spatial light modulator either passes through a polarization analyzer or is absorbed by the polarization analyzer, depending on the direction of the electric field applied to each pixel.

The resulting optical characteristics of each pixel of both the transmissive and reflective spatial light modulators are substantially binary: each pixel either transmits light (its 1 state) or absorbs light (its 0 state), and therefore appears light or dark, depending on the direction of the electric field. Polarization analyzers are less than 100 percent efficient, however, absorbing a fraction of the light that should be transmitted in the 1 state and transmitting a fraction of the light that should be absorbed in the 0 state. The ratio of the intensity of light transmitted in the 1 state to the intensity of light transmitted in the 0 state is known as the "contrast ratio" or simply as "contrast." A contrast ratio of at least 100:1 is required for excellent image quality and is usually found in CRT based displays.

To produce the grayscale required for conventional display devices, the apparent brightness of each pixel is varied. In nematic liquid crystal-based spatial light modulators, grayscale is achieved by changing the voltage of the drive pulse. Ferroelectric liquid crystal-based spatial light modulators, however, are digital devices switching between the 1 state and the 0 state almost independent of drive voltage. Grayscale in ferroelectric liquid crystal-based spatial light modulators is therefore achieved by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

To produce color output required for conventional display devices, a single spatial light modulator may be used or multiple spatial light modulators may be used. In order to produce a color output from a single spatial light modulator, the spatial light modulator is illuminated sequentially with light of different colors, typically red, blue, and green. This sequential illumination may be accomplished using multiple light sources, each having one of the desired illumination colors, or by using a "white" light source with sequential color filtering. For purposes of this description a "white" light source is one that emits light over a broad portion of the visible light spectrum. In either case, each of the sequential colors is modulated individually by the spatial light modulator to produce three sequential single-color images. If the sequence of single-color images occurs quickly enough, a viewer of the sequential single-color images will be unable to distinguish the sequential single-color images from a full-color image.

To produce color output using multiple spatial light modulators, each of the spatial light modulators is simultaneously illuminated with a different colored light. This can be accomplished using multiple light sources, each having one of the desired illumination colors, or by using a "white" light source with a color separator. Typically three spatial light modulators are used, one illuminated with red light, one with blue light, and one with green light. Each of the spatial light modulators modulates the colored light that illuminates it to form a single-colored image, and the single-colored images from each of the spatial light modulators are combined into a single full-color image.

FIG. 1 shows part of a conventional display device 5 incorporating a conventional reflective light valve 10 that includes the reflective ferroelectric liquid crystal-based spatial light modulator 12. Other principal components of the light valve are the polarizer 14, the beam splitter 16 and the analyzer 18. The light valve is illuminated with light from the light source 20, the light from which is concentrated on the polarizer using a reflector 22 and collector optics 24. The light output by the light valve passes to the imaging optics 26 that focus the light to form an image (not shown). The light valve 10, light source 20 and imaging optics may be incorporated into various types of display device, including miniature, wearable devices, cathode-ray tube replacements, and projection displays.

Light generated by the light source 20 enters the light valve 10 by passing through the polarizer 14. The polarizer polarizes the light output from the light source. Alternatively, a polarized light source (not shown) can be used and the need for the polarizer 14 would be eliminated. The beam splitter 16 then reflects a fraction of the polarized light output from the polarizer towards the spatial light modulator 12. The beam splitter can additionally or alternatively be a polarizing beam splitter configured to reflect light having a direction of polarization parallel to the direction of polarization of the polarizer 14 towards the spatial light modulator 12. The spatial light modulator 12 is divided into a two-dimensional array of picture elements (pixels) that define the spatial-, resolution of the light valve 10. Light reflected from the spatial light modulator can pass to the beam splitter 16 which transmits a fraction of the reflected light to the analyzer 18. If the beam splitter is a polarizing beam splitter, however, only light having a direction of polarization orthogonal to the direction of polarization imparted by the polarizer will be transmitted, effectively acting as an analyzer, and the need for an independent analyzer may be eliminated.

The direction of an electric field in each pixel of the spatial light modulator 12 determines whether or not the direction of polarization of the light reflected by the pixel is rotated by 90° relative to the direction of polarization of the incident light. The light reflected by each pixel of the spatial light modulator passes through the beam splitter 16 and the analyzer 18 and is output from the light valve 10 through the imaging optics 26 depending on whether or not its direction of polarization was rotated by the spatial light modulator.

More specifically, the polarizer 14 polarizes the light generated by the light source 20 that passes through the collector optics 24 either directly or after reflecting off reflector 22. The polarization is preferably linear polarization. The beam splitter 16 reflects the polarized light output from the polarizer towards spatial light modulator 12, and the polarized light reflected from the spatial light modulator transmits to the analyzer 18 through the beam splitter 16. The direction of maximum transmission of the analyzer is orthogonal to that of the polarizer in this example.

For purposes of this description, the terms parallel and orthogonal will be used to describe directions of polarization and directions of maximum transmissivity and minimum transmissivity. When these terms are used within this description, it is understood that they relate to the optical characteristics of the light and of the various components that comprise the light valve and not necessarily to their spatial relationships. For example, when polarized light reflects from a mirror at an angle of incidence of 45°, the polarized light is reflected at an angle of 90° relative to the incident light. Even though the incident light and the reflected light are spatially orthogonal to one another, the direction of polarization of the reflected light will be optically unchanged from the direction of polarization of the incident light. Thus, the direction of polarization of the reflected light may be said to be parallel to the direction of polarization of the incident light. In addition, as used herein the term parallel shall include directions that are both parallel and anti-parallel, i.e., having a direction 180° opposed, to the original direction.

The spatial light modulator 12 is composed of a transparent electrode 28 deposited on the surface of a transparent cover 30, a reflective electrode 32 located on the surface of the semiconductor substrate 34, and a ferroelectric liquid crystal layer 36 sandwiched between the transparent electrode 28 and the reflective electrode 32. The reflective electrode is divided into a two-dimensional array of pixel electrodes that define the pixels of the spatial light modulator and of the light valve. A substantially reduced number of pixel electrodes are shown to simplify the drawing. For example, in a light valve for use in a large-screen computer monitor, the reflective electrode could be divided into a two-dimensional array of 1600×1200 pixel electrodes. An exemplary pixel electrode is shown at 38. Each pixel electrode reflects the portion of the incident polarized light that falls on it towards the beam splitter 16.

A drive circuit including signal processing electronics may be located in the semiconductor substrate 34. An example of such a drive circuit 50 with signal processing electronics 52 and an exemplary pixel is shown in FIG. 2. Regarding this figure and those that follow, it is noted that identical reference numerals are used to designate identical or similar elements throughout the several views, and that elements are not necessarily shown to scale. The drive circuit has external connections to a voltage source with voltage level $V_S$, ground, and a video signal 40. The drive circuit applies a drive signal to the pixel electrode 38 of each pixel of the spatial light modulator 12. The drive signal can be switched between two voltage levels, $V_S$ and ground. The switching of the drive signal supplied to the pixel electrode 38 is controlled by the signal processing electronics 52 though two transistors $T_1$ and $T_2$ in response to a portion of the video signal 40. The gates of the two transistors are in electrical communication with the signal processing electronics at nodes $P+_1$ and $P-_1$, respectively. Other nodes are provided in the signal processing electronics for providing a drive signal to the remaining pixels (not shown).

Two matched resistors, R1 and R2, connected in series between $V_S$ and ground, are used to provide a voltage level equal to $\frac{1}{2}V_S$ between the resistors. An isolation amplifier A with unity gain has its input connected between the two matched resistors and its output connected to and the transparent electrode 28. The isolation amplifier ensures that the voltage level at the transparent electrode is maintained at $\frac{1}{2}V_S$, a fixed voltage level mid-way between the voltage levels of the drive signal. Without the isolation amplifier A, transient currents that occur at the transparent electrode when the drive signal at the pixel electrode 38 switches between $V_S$ and ground could affect the amount of the current drawn through one of the matched resistors and thus alter the voltage level between the resistors.

The potential difference between the pixel electrode 38 and the transparent electrode 28 establishes an electric field across the part of the liquid crystal layer 36 between the pixel and transparent electrodes. The direction of the electric field determines whether the liquid crystal layer rotates the direction of polarization of the light reflected by the pixel electrode, or leaves the direction of polarization unchanged.

Referring back to FIG. 1, since light passes through the reflective spatial light modulator twice, once before and once after reflection by the reflective pixel electrodes, the reflective spatial light modulator 12 is structured as a quarter-wave plate. The thickness of the layer of ferroelectric liquid crystal material in the liquid crystal layer 36 is chosen to provide an optical phase shift of 90° between light polarized parallel to the director of the liquid crystal material and light polarized perpendicular to the director. The liquid crystal material is preferably a Smectic C* surface stabilized ferroelectric liquid crystal material having an angle of 22.5° between its director and the normal to its smectic layers. Reversing the direction of the electric field applied to such a liquid crystal material switches the director of the material through an angle of about 45°. Consequently, if the director is aligned parallel to the direction of maximum transmission of the analyzer 18 with one polarity of the electric field, reversing the direction of the electric field will rotate the direction of polarization of light reflected by the pixel through 90°. This will align the direction of polarization of the light orthogonal to the direction of maximum transmission of the analyzer, and will change the pixel from its 1 state, in which the pixel appears bright, to its 0 state, in which the pixel appears dark.

Since the direction of maximum transmission of the analyzer 18 is orthogonal to the direction of polarization defined by the polarizer 14, light whose direction of polarization has been rotated through 90° by a pixel of the spatial light modulator 12 will pass through the analyzer and be output from the light valve 10 whereas light whose direction of polarization has not been rotated will not pass through the analyzer. The analyzer only transmits to the imaging optics 26 light whose direction of polarization has been rotated by pixels of the spatial light modulator. The pixels of the spatial light modulator will appear bright or dark depending on the direction of the electric field applied to each pixel. When a pixel appears bright, it will be said to be in its 1 state, and when the pixel appears dark, it will be said to be in its 0 state.

The direction of maximum transmission of the analyzer 18 can alternatively be arranged parallel to that of the polarizer 14, and a non-polarizing beam splitter can be used as the beam splitter 16. In this case, the spatial light modulator 12 operates in the opposite sense to that just described.

In a miniature, wearable display, the imaging optics 26 are composed of an eyepiece that receives the light reflected by the reflective electrode 32 and forms a virtual image at a predetermined distance in front of the user (not shown). In a cathode-ray tube replacement or in a projection display, the imaging optics are composed of projection optics that focus an image of the reflective electrode on a transmissive or reflective screen (not shown). Optical arrangements suitable for use as an eyepiece or projection optics are well known in the art and will not be described here.

To produce the grey scale required by a display device notwithstanding the binary optical characteristics of the pixels of the light valve 10, the apparent brightness of each pixel is varied by temporally modulating the light reflected by the pixel, as described above. The drive circuit (not shown) for each pixel of the spatial light modulator determines the duration of the 1 state of the pixel in response to a portion of the input video signal 40 corresponding to the location of the pixel in the spatial light modulator.

FIGS. 3A–3E illustrate the operation of the exemplary pixel 38 of the conventional light valve 10 shown in FIG. 1 during three consecutive display periods. The remaining pixels operate similarly. In one embodiment of a conventional light valve, each display period corresponded to one frame of the input video signal 40. In another embodiment, each display period corresponded to a fraction of one frame of the input video signal. Each display period is composed of an illumination period (ILLUM) and a balance period (BALANCE) having equal durations, as shown in FIG. 3A.

FIG. 3B shows the drive signal applied to the exemplary pixel electrode 38. The transparent electrode 28 is held at a voltage level of $V_S/2$, so that changing the voltage level on the pixel electrode from 0 (ground) to $V_S$ reverses the direction of the electric field applied to the ferroelectric liquid crystal layer 36. The level of the drive signal is $V_S$ for a first temporal portion 1TP of each illumination period. The level of the drive signal is 0 for the second temporal portion 2TP constituting the remainder of the illumination period, and also for the first temporal portion 1TP of the subsequent balance period. The first temporal portion of the balance period has a duration equal to the first temporal portion of the illumination period. However, the level of the drive signal is 0 during the first temporal portion of the balance period, whereas the level of the drive signal is $V_S$ during the first temporal portion of the illumination period. Finally, the level of the drive signal changes to $V_S$ for the second temporal portion 2TP constituting the remainder of the balance period. Consequently, during the balance period, the level of the drive signal is 0 and $V_S$ for times equal to the times that it was at $V_S$ and 0, respectively, during the illumination period. As a result, the electric field applied to the liquid crystal material of the pixel averages to zero over the display period.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 40.

FIG. 3C shows the effect of the spatial light modulator 12 on the direction of polarization of the light impinging on the analyzer 18. The direction of polarization is indicated by the absolute value of the angle α between direction of polarization of the light impinging on the analyzer and the direction of maximum transmissivity of the analyzer. The analyzer transmits light having an angle α close to zero and absorbs light having an angle α close to 90°. In each display period, the angle α has values corresponding to the pixel being bright and dark for equal times due to the need to restore the DC balance of the pixel.

FIG. 3D shows the condition of a fast-acting light source 20. The light source is ON throughout the illumination period of each display period, and is OFF during the following balance period. Alternatively, the light source could remain on and a shutter (not shown) could be used to control whether the light generated by the light source illuminates the spatial light modulator 12. For example, an open shutter would correspond to the light source being ON and a closed shutter would correspond to the light source being OFF.

FIG. 3E shows the light output from the exemplary pixel of the light valve 10 controlled by the pixel electrode 38. Light is output from the pixel only during the first temporal portion of the illumination period of each display period. No light is output during the second temporal portion of the illumination period. Moreover, no light is output during the balance period of the display period because the light source 20 is OFF during the balance period.

The light valve 10 shown in FIG. 1 can also be adapted to provide a colored light output to the imaging optics 26.

One way that this can be done is by replacing the "white" light source 20 with three colored light sources such as a red, blue and green LEDs (not shown), each illuminating the spatial light modulator 12 sequentially. This would require a balance period after each sequential illumination period. Another way that a colored light output can be provided is by replacing the single reflective spatial light modulator 12 shown in FIG. 1 with three reflective spatial light modulators and a color separator for separating the light into three component colors.

An example of one such color configuration is depicted in FIG. 4. In FIG. 4, the color separator is a series of three dichroic plates 42, 43, 44, each having an associated reflective spatial light modulator 12. Each of the dichroic plates is configured to reflect light in a band of wavelengths (colorband) particular to that dichroic plate and to pass the remaining wavelengths of light. Thus, if the light source 20 is a "white" light, emitting visible light across the entire visible color spectrum, a particular portion of the color spectrum may be reflected by each dichroic plate its associated reflective spatial light modulator simultaneously. This eliminates the need for sequential illumination and improves the perceived brightness of the color pixels passing through the analyzer.

For example, the dichroic plate 42 nearest the beam splitter 16 might reflect red-colored light toward its associated spatial light modulator 12 while the center dichroic plate 43 reflects green-colored light toward its associated spatial light modulator and the dichroic plate remote from the beam splitter 44 reflects blue-colored light towards its spatial light modulator. When the light source 20 is ON, as shown if FIG. 2, the colored light reflected by the dichroic plates passes to each of the three reflective spatial light modulators 12. Each of the three reflective spatial light modulators is capable of reflecting pixels of the colored light back at its associated dichroic plate in a manner consistent with the above description of the operation of the spatial light modulator shown in FIG. 1.

The majority of the colored light reflected by each of the spatial light modulators 12 will be reflected by its associated dichroic plate toward the analyzer 18 since the light reflected by each spatial light modulator will retain the characteristic wavelengths of light originally reflected by its respective dichroic plate. When the combined colored light from each of the three reflective spatial light modulators 12 passes through the analyzer, a full color image can be formed by the imaging optics 26.

FIG. 5 depicts the use of a color separation cube 46, sometimes known as an x-cube or crossed-dichroic cube, as a color separator in place of the three dichroic plates. As with the three dichroic plates, the color separation cube separates three distinct color bands from the "white" light created by light source 20 and directs each of the color bands to a particular spatial light modulator 12. The color separation cube 46 also recombines the light reflected from each of the spatial light modulators 12 and directs the combined light toward the analyzer 18. The use of a color separation cube allows for a more compact design utilizing three spatial light modulators than can be achieved using three separate dichroic plates.

FIG. 6 depicts the use of a third type of color separator, a three-prism color separator 48 (sometimes known as a Philips cube or Philips prism), in a light valve utilizing three spatial light modulators to generate a color image. The design and use of a three-prism color separator is described in detail in U.S. Pat. No. 5,644,432, the contents of which are incorporated herein by reference. Like the previously described color separators, the three-prism color separator separates three distinct color bands from the "white" light created by light source 20 and directs each of the color bands to a particular spatial light modulator 12. The three-prism color separator 48 also recombines the light reflected from each of the spatial light modulators 12 and directs the combined light toward the analyzer 18.

Whether the light valve includes a single spatial light modulator 12 or three, it is important that a high contrast ratio between the 1 state and the 0 state be maintained. The precise alignment of the direction of polarization of light reflected from each pixel either parallel to or orthogonal to the direction of maximum transmissivity of the analyzer 18 is of critical importance in order to maintain the high contrast ratio. Even slight misalignment will cause the a portion of the light which should be transmitted by the analyzer 18 in the 1 state to be absorbed and a portion of the light which should be absorbed by the analyzer in the 0 state to be transmitted. Light transmitted through the analyzer in the 0 state is known as "dark state luminance" and significantly influences image quality and quickly drives the contrast ratio down.

The precise alignment of the direction of polarization reflected by the pixels is affected by a number of mechanical tolerances encountered during the assembly of the light valve 10. Tolerances in the mechanical alignment of the polarizer 14, the spatial light modulator 12 and the analyzer 18 are typically plus or minus one-half degree and contribute to misalignment. In addition, during assembly of the spatial light modulator 12, the angle at which the normal to the smectic layers of the ferroelectric liquid crystal material 36 is aligned relative to the substrate 34 (pre-alignment angle) has a tolerance that is also typically plus or minus one-half degree that may contribute to misalignment. Once the light valve 10 is assembled, these tolerances result in a permanent fixed offset.

In addition to the permanent fixed offset, however, the direction of polarization of light reflected from the pixels is affected by variations in the tilt angle of the ferroelectric liquid crystal material with temperature change. Tilt angle is the angle that the director of the ferroelectric liquid crystal material switches through when the direction of the electric field across the ferroelectric liquid crystal material is reversed. The tilt angle is symmetric around the pre-alignment angle. Thus, if the director of the liquid crystal material at a particular temperature forms an angle of 22.5° with the normal to its smectic layers when exposed to an electric field having a forward direction, the director switches through a tilt angle of 45° when the direction of the electric field reverses. Tilt angle usually changes by between one and two degrees during a change from room temperature to operating temperature. Operating temperature is typically 60° C. with the increase in temperature coming from heat generated by the operation of the drive circuits 50 and the absorption of energy from the light illuminating the spatial light modulator.

FIGS. 7A and 7B show how variations in tilt angle with temperature affect operation of the light valve. FIG. 7A depicts an analyzer 18 and a ferroelectric liquid-crystal-based spatial light modulator 12 at room temperature, such as when a light valve is first turned on. FIG. 7B shows the same analyzer and spatial light modulator at normal operating temperature. The direction of maximum transmissivity of the analyzer is indicated in both figures by line 54 with closed arrow heads, while the orthogonal direction of minimum transmissivity is shown by the line 56 with open arrow heads. The direction of polarization of light reflected by pixels having an electric field in the forward direction is depicted in both figures by line 58 with closed arrow heads. The direction of polarization of light reflected by pixels having an electric field in the reverse direction is depicted in both figures by line 60 with closed arrow heads.

In FIG. 7A, the angle between the direction of polarization of the light reflected from pixels having a forward electric field and pixels having a reverse electric field is indicated as a room temperature angle (RTA) greater than 90°. While RTA would actually be only slightly greater than 90°, its magnitude has been exaggerated in the figure for clarity. The slight misalignment between the direction of polarization of light reflected from the spatial light modulator 58, 60 and the direction of maximum or minimum transmnissivity of the analyzer 54, 56 reduce the contrast ratio of the light valve. The misalignment between the direction of polarization of light having a direction 60 and the direction of minimum transmissivity 56 has a substantially greater effect on the contrast ratio than does the misalignment between the direction of polarization of light having a direction 58 and the direction of maximum transmissivity 54.

In FIG. 7B, the angle between the direction of polarization of the light reflected from pixels having a forward electric field and pixels having a reverse electric field is indicated as an operating temperature angle (OTA) less than 90°. While OTA would actually be only slightly less than 90°, its magnitude has been exaggerated in the figure for clarity. Again, the slight misalignment between the direction of polarization of light reflected from the spatial light modulator 58, 60 and the direction of maximum or minimum transmissivity of the analyzer 54, 56 reduce the contrast ratio of the light valve. In this case, the performance of the light valve at neither room temperature or operating temperature is optimal, but a compromise exists so the performance at room temperature is not noticeably worse than it is at room temperature.

It is possible for manufacturers to minimize the permanent fixed offset by actively aligning the components. This process requires that a skilled assembler illuminate the system with a light source 20 and mechanically align all the components once they have reached operating temperature until the contrast ratio is maximized. The process of active alignment is both time consuming and expensive and thus not well suited for mass production. In addition, light valves can be designed with heaters to keep the spatial light modulator at operating temperature even when not in use so that the variation in tilt angle with changes in temperature will not affect performance of the system. The heated light valve systems minimize or eliminate warm up time and provides stability in the contrast ratio. The heated light valve systems, however, requires the expense of the heater components and have the disadvantage that they consume power even in the "off" state and will not work if the system is turned off by disconnecting the light valve (and thus the heaters) from a power source.

Factory settings and heaters, however, do not offer the dynamic minute to minute adjustment of contrast control that may be appropriate, especially during warmup, nor do they offer a user the ability to adjust contrast. Consequently, what is needed is a light valve system with automatic contrast correction and the ability for a user to change contrast settings.

SUMMARY OF THE INVENTION

The invention provides a ferroelectric liquid crystal-based light valve system with contrast control and a method for controlling contrast in a ferroelectric liquid crystal-based light valve system. The light valve system with contrast control includes a light input, a ferroelectric liquid crystal-based spatial light modulator, an analyzer, and a voltage controller. Light having a first direction of polarization is received through the light input. The ferroelectric liquid crystal-based spatial light modulator includes signal processing electronics and an array of pixels. The array of pixels is configured to receive light from the light input and includes an array of pixel electrodes, a transparent electrode, and a layer of ferroelectric liquid crystal material.

Each pixel electrode in the array of pixel electrodes defines the location of one pixel in the array of pixels and is independently switchable between a first voltage level and a second voltage level by the signal processing electronics. One of the first voltage level and the second voltage level may be ground and the other may be a variable input voltage level. The first voltage level corresponds to a first pixel condition in which light exiting the pixel has a second direction of polarization. The second voltage level corresponds to a second pixel condition in which light exiting the pixel has a third direction of polarization that is within about 5 degrees of orthogonal to the second direction of polarization. The signal processing electronics may have an input voltage level equal to one of the first voltage level and the second voltage level.

The transparent electrode is held at a third voltage level between the first voltage level and the second voltage level. The third voltage level may be equal to half the difference between the first voltage level and the second voltage level. The layer of ferroelectric liquid crystal material is sandwiched between the array of pixel electrodes and the transparent electrode.

The analyzer has orthogonal directions of maximum transmissivity and minimum transmissivity and is also positioned to receive the light exiting the array of pixels. The analyzer is additionally aligned with the direction of minimum transmissivity within about 5 degrees of the second direction of polarization, and the direction of maximum transmissivity aligned within about 5 degrees of the third direction of polarization.

The voltage controller is configured to adjust at least one of the first voltage level and the second voltage level through a first range of voltages and a second range of voltages, respectively, and may be configured not affect the input voltage level of the signal processing electronics. As the voltage controller adjust the variable input voltage level though its range of voltages, at least one of the second and the third direction of polarization may rotate by at least 2 degrees. The voltage controller may operated in response to a user input.

The light valve system may further comprise a light intensity sensor and a feedback circuit in electrical communication with the light intensity sensor and the voltage controller. The light intensity sensor is configured to detect the intensity of the light having the second direction of polarization transmitted through the analyzer. The feedback circuit may be configured to automatically minimize the light having the second direction of polarization illuminating the light intensity sensor.

The method of controlling contrast in a ferroelectric light valve system begins by providing a ferroelectric liquid crystal-based spatial light modulator that includes a plurality of pixels and signal processing electronics. The signal processing electronics independently switch an electric field across each of the plurality of pixels between a forward direction and a reverse direction.

Next, an analyzer is provided that has a direction of minimum transmissivity. The analyzer is mechanically aligned with the ferroelectric spatial light modulator. The alignment is such that when the plurality of pixels is illuminated by light having a first direction of polarization, the light exiting those of the pixels having an electric field with a direction that is one of either forward or reverse has a second direction of polarization that is aligned within 5 degrees of the direction of minimum transmissivity.

The plurality of pixels are then illuminated with light having the first direction of polarization and a video signal is provided to the signal processing electronics. The electric field across a majority of the plurality of pixels is then switched independently between the forward direction and the reverse direction in response to the video signal.

Next, a contrast control signal is detected. Detecting the control signal may include checking for an input from a contrast control user interface. Detecting the control signal may also include providing an automatic contrast control feedback circuit. If provided, the feedback circuit may include a light intensity sensor configured to detect the intensity of light exiting at least one of the plurality of pixels and transmitted through the analyzer. Detecting the control signal may also include switching the at least one of the plurality of pixels to one of the forward direction and the reverse direction electric field so the direction of polarization of light exiting the at least one of the plurality of pixels is aligned within 5 degrees of the direction of minimum transmissivity. Alternatively, the majority of the pixels may be uniformly switched to one of the forward electric field and the reverse electric field and the intensity of light detected with the light intensity detector.

The second direction of polarization is then rotated by changing the magnitude of the electric field across the plurality of pixels in response to the control signal. The direction of polarization of the light exiting the plurality of pixels may be rotated until the intensity of light received by the light intensity sensor is minimized. Alternatively, the direction of polarization of the light exiting the plurality of pixels can be rotated until the direction of polarization of the light exiting the plurality of pixels having one of a forward direction electric field and a reverse direction electric field is parallel to the direction of minimum transmissivity.

Accordingly, the invention provides a light valve system with contrast control and the method of controlling contrast in a light valve system. Other features and advantages of the present invention will become apparent from the following detailed description, taken in conjunction with the accompanying drawings, illustrating, by way of example, the principles of the invention.

DETAILED DESCRIPTION OF THE INVENTION

The invention is based, in part, on the concept that the tilt angle of ferroelectric liquid crystal material can be influenced by changes in the magnitude of the electric field across the ferroelectric liquid crystal material. While the change in tilt angle achieved by changing the magnitude of the electric field are not enough for grayscale control, they can be used to adjust the contrast ratio in ferroelectric liquid crystal-based light valve systems.

Figure 1:
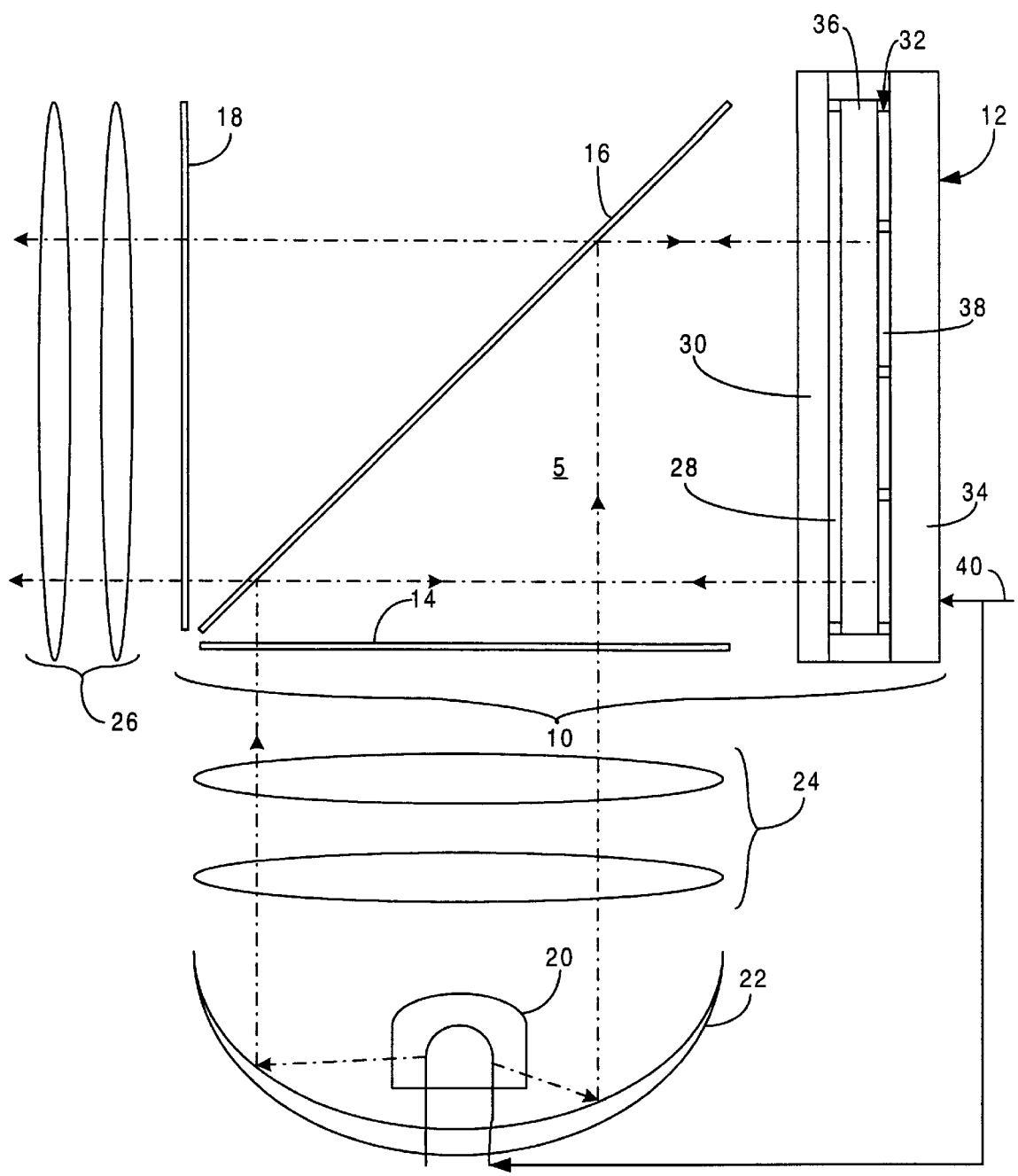
FIG. 1 is a schematic diagram of part of a prior art display device incorporating a conventional reflective light valve system with a single spatial light modulator.
Figure 2:
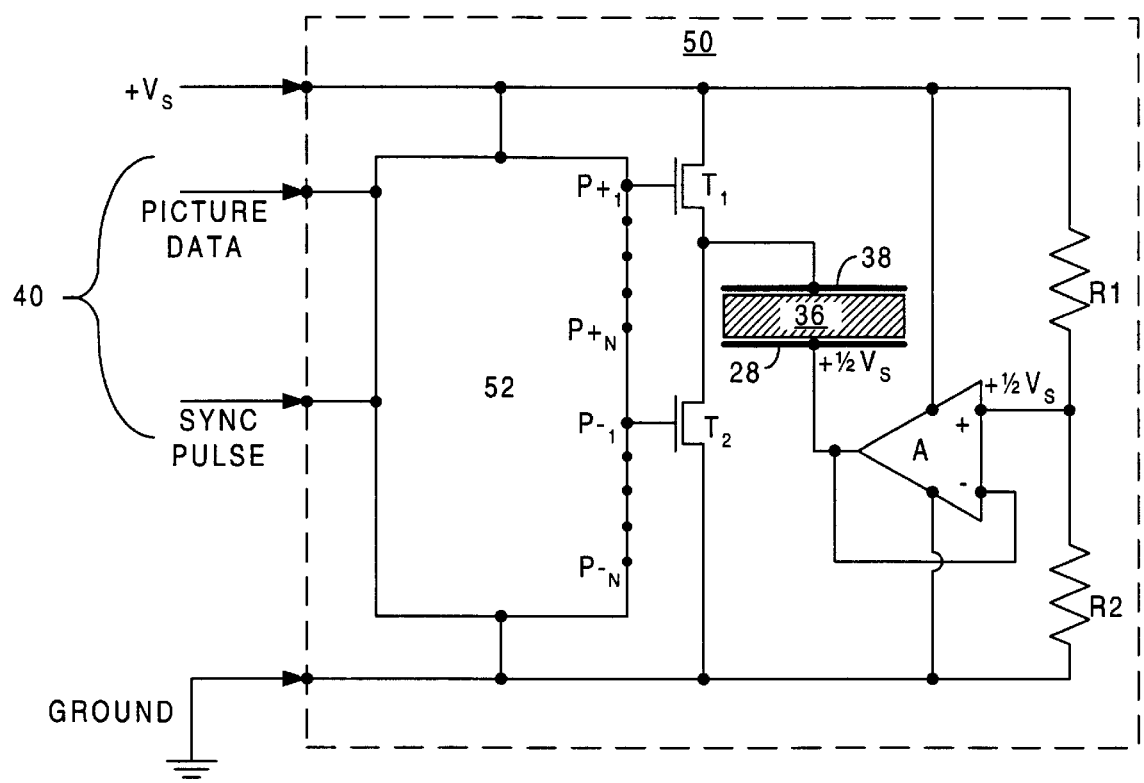
FIG. 2 is a schematic diagram of a prior art drive circuit from a spatial light modulator like that shown in FIG. 1.
Figure 3:
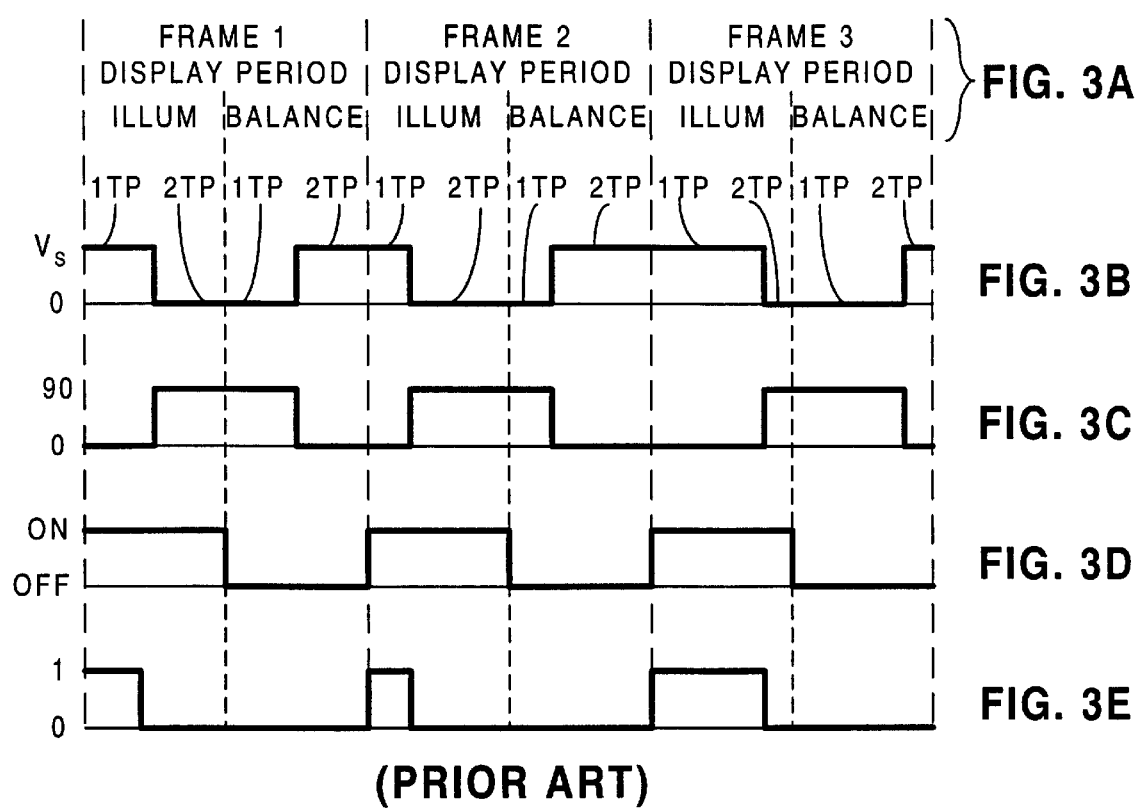
FIGS. 3A–3E illustrate the operation of the conventional reflective light valve shown in FIG. 1.

The magnitude of an electric field across the ferroelectric liquid crystal material is proportional to the difference in voltage levels between a transparent electrode and a pixel electrode between which it is sandwiched. The difference in voltage levels is typically between 1.6 volts and 2.5 volts which is one-half of standard 3.3 volt and 5 volt power supplies. It is understood, however, that the difference in voltage levels may be as small as 0.2 volts and as high as 25 volts. These voltage levels are typically derived from standard power supplies using a drive circuit like that shown in FIG. 2. The drive circuit switches the voltage level of the pixel electrode between the constant voltage supply level ($V_S$) and ground while the transparent electrode is held at a voltage level of one-half the voltage supply level ($\frac{1}{2}V_S$). Thus, the magnitude of the electric field across the ferroelectric liquid crystal material is typically fixed, and its direction is switched from forward to reverse.

Changing the difference between the voltage levels of the pixel electrode and the transparent electrode results in a slight change in tilt angle of the ferroelectric liquid crystal material sandwiched between them. The change in tilt angle is typically about 2 degrees for each one-half volt change in the difference between the voltage levels of the pixel electrode and the transparent electrode.

The light valve system with contrast control and the method of contrast control in a light valve system according to the invention are based on the concept that contrast can be controlled by using a variable voltage level source to drive the electric field across the ferroelectric liquid crystal material instead of a fixed voltage level source.

Figure 8:
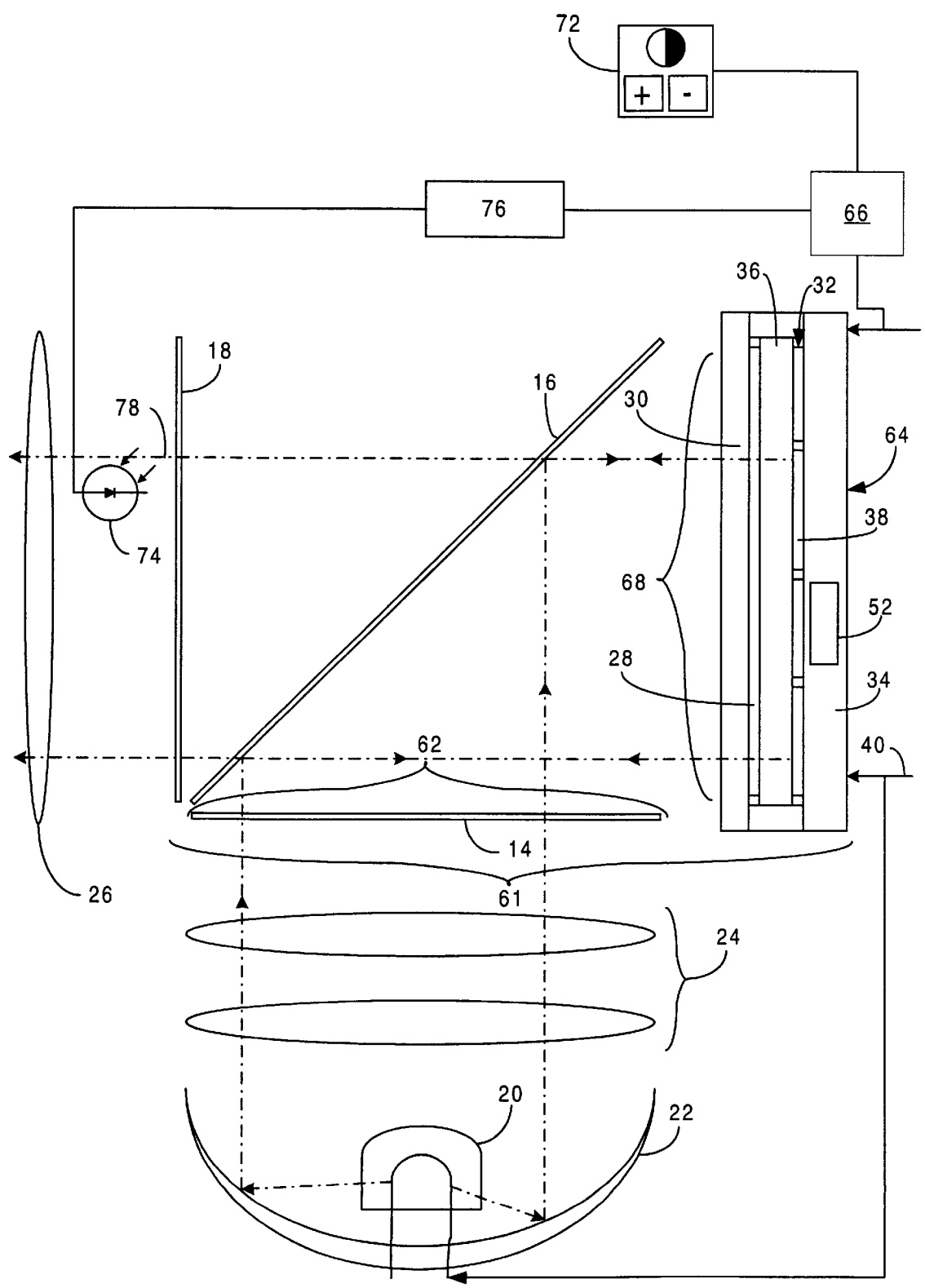
FIG. 8 is a schematic diagram of part of a display device incorporating a light valve system that includes contrast control according to the invention.

FIG. 8 depicts the ferroelectric liquid crystal-based light valve system 61 with contrast control according to the invention. Regarding this figure and those that follow, it is noted that identical reference numerals are used to designate identical or similar elements throughout the several views, and that elements are not necessarily shown to scale. The light valve system according to the invention includes a light input 62, a ferroelectric liquid crystal-based spatial light modulator 64, an analyzer 18, and a voltage controller 66. Light having a first direction of polarization is received through the light input. Preferably the first direction of polarization is fixed by mechanically pre-aligning a polarized light source (not shown) or a polarizer 14 with the rest of the light valve system.

The spatial light modulator 64 includes signal processing electronics 52 and an array of pixels 68. The array of pixels receives light from the light input either directly (not shown) or via a beam splitter 16. The array of pixels includes an array of pixel electrodes 32, a transparent electrode 28, and a layer of ferroelectric liquid crystal material 36. Each pixel electrode 38 in the array of pixel electrodes 32 defines the location of one pixel in the array of pixels 68. Each pixel electrode is also independently switchable by the signal processing electronics 52 between a first voltage level and a second voltage level.

Figure 9:
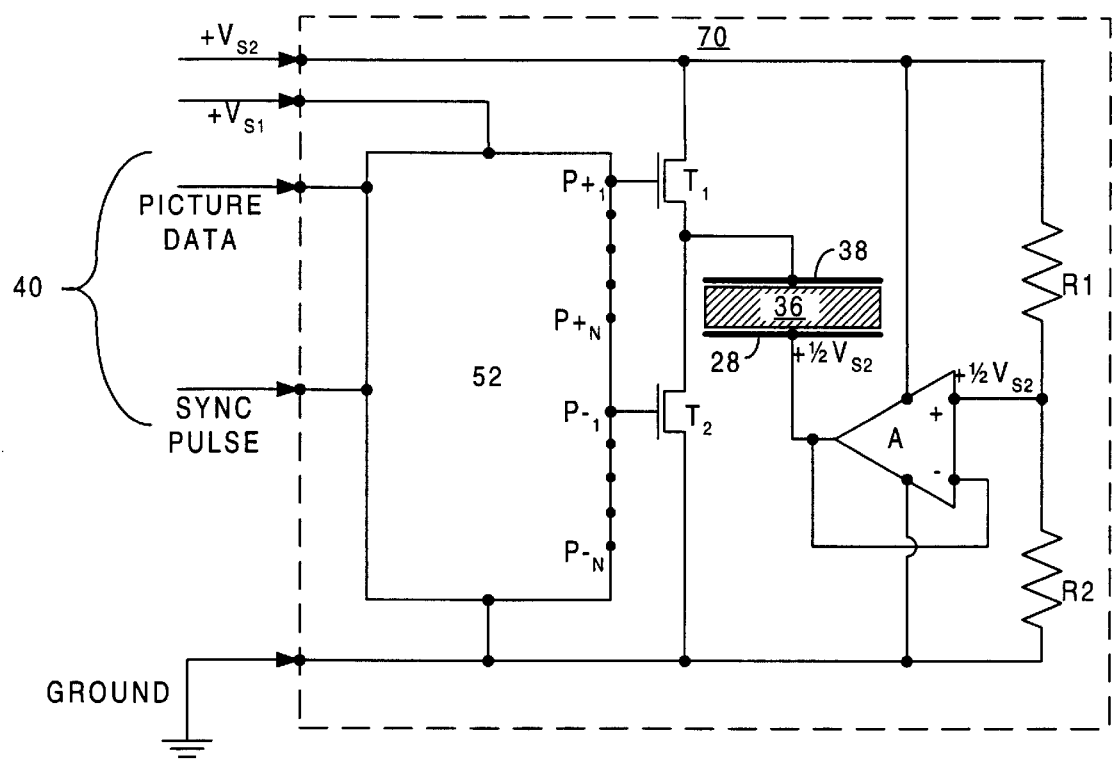
FIG. 9 is a schematic diagram of a drive circuit from a spatial light modulator with contrast control according to the invention.

FIG. 9 depicts a drive circuit 70 according to the invention that indicates one way that the signal processing electronics can switch the voltage level supplied to the pixel electrode 38 between the first and second voltage levels. The transparent electrode 28 is held at third voltage level between the first voltage level and the second voltage level, and preferably midway between the first and second voltage levels. Thus, switching between the first voltage level and the second voltage level reverses the direction of an electric field across the ferroelectric liquid crystal material 36. Preferably, one of the first and second voltage levels is ground and the other is a variable input voltage level ($+V_{S2}$). Thus, the third voltage level would preferably be at a level equal to one-half the variable input voltage level ($\frac{1}{2}V_{S2}$). Those skilled in the art will see that various other voltage level schemes can be used to reverse the electric field across the ferroelectric liquid crystal material. For example (not shown), the first and second voltage levels can be opposed variable voltage levels ($+V_{S2}$ and $-V_{S2}$) while the third voltage level is held at ground.

When the pixel electrode 38 is switched to the first voltage level by the signal processing electronics 52, the field across the ferroelectric liquid crystal material will have one of a forward and a reverse direction. This electric field direction corresponds to a first pixel condition in which light exiting the pixel has a second direction of polarization (the 0 state). When the pixel electrode is switched to the second voltage level by the signal processing electronics, the field across the ferroelectric liquid crystal material will have the other of a forward and a reverse direction. This electric field direction corresponds to a second pixel condition in which light exiting the pixel has a third direction of polarization (the 1 state) that is within 5 degrees of orthogonal to the second direction of polarization.

The signal processing electronics 52 are typically designed to operate over a narrow range of voltages. This narrow range of voltages may be enough to provide some contrast control for the pixels. In one embodiment of the invention, the signal processing electronics are powered by an input voltage level equal to one of the first voltage level and the second voltage level. Preferably, this is the same variable voltage level ($V_{S2}$) that is switched to the pixel electrode 38. This embodiment is not shown in FIG. 9, but is similar to the drive circuit 50 shown in FIG. 2 except that the constant input voltage level ($+V_S$) is replaced with the variable input voltage level ($+V_{S2}$). In this first embodiment, the range of voltages that the variable input voltage level ($+V_{S2}$) may have is limited to the narrow range of voltages over which the signal processing electronics can reliably operate.

In a second embodiment of the invention as shown in FIG. 9, the drive circuit 70 has both a variable input voltage level ($+V_{S2}$) and a constant input voltage level ($+V_{S1}$,). The constant input voltage level ($+V_{S1}$,) powers the signal processing electronics 52 and is preferably set at a constant level chosen to optimize the operation of the signal processing electronics. This embodiment allows the variable input voltage level ($+V_{S2}$) to operate over a wider range of voltages, and thus allows a greater range of contrast control.

Referring now back to FIG. 8, the analyzer 18 of the light valve system according to the invention has orthogonal directions of maximum transmissivity and minimum transmissivity. The analyzer is positioned to receive the light exiting the array of pixels 68. Further, the analyzer is preferably aligned with the direction of minimum transmissivity within 5 degrees of the second direction of polarization and with the direction of maximum transmissivity aligned within 5 degrees of the third direction of polarization. The positioning and alignment of the analyzer 18 is preferably fixed during assembly of the light valve system. For purposes of this description, the analyzer can be either an single purpose analyzer 18 or its functional equivalent. For example, a polarizing beam splitter 16 can operate as an analyzer as previously described.

The voltage controller 66 of the light valve system according to the invention can be either internal (not shown) or external to the spatial light modulator 64. The voltage controller is configured to adjust at least one of the first voltage level and the second voltage level through a first range of voltages and a second range of voltages, respectively. Whether the first voltage level, the second voltage level, or both are adjusted, what is important is how these adjustments change the difference is voltage between the pixel electrode 28 and the transparent electrode 28. Thus, the voltage controller functionally controls the magnitude of the electric field across the ferroelectric liquid crystal material.

Preferably, one of the first and second voltage levels is ground and the other is the variable input voltage level ($V_{S2}$). In addition, one of the first range of voltages and the second range of voltages is a variable input range of voltages. Thus, the voltage controller is configured to adjust the variable input voltage level ($V_{S2}$) through the variable input range of voltages which is preferably between about 3 and 5 volts, although wider ranges are possible. Narrower ranges may, however, be necessary, particularly if the signal processing electronics 52 are powered by the same variable input voltage level ($V_{S2}$) as discussed for one embodiment, above.

As the voltage controller adjusts the variable input voltage level through the variable input range of voltages, the magnitude of the electric field across the ferroelectric liquid crystal material in both the forward direction and the reverse direction is changed enough that at least one of the second and the third direction of polarization is rotated. Preferably, at least one of the second and third direction of polarization rotate by at least 2 degrees of rotation occur over the variable input range of voltages.

In light valve systems with drive circuits like that shown in FIG. 9, the magnitude of the electric field across the ferroelectric liquid crystal material in both the forward and reverse direction changed as the single variable input voltage level changes. This is because the third voltage level is also variable and is a function of the variable input voltage level. Alternatively, the third voltage level may be held at a fixed level. In such a case, both the first voltage level and the second voltage level would have to be changed by the voltage controller 66 in order to effect a change in magnitude of the electric field across the ferroelectric liquid crystal material in both the forward and reverse directions. It is also possible to design a light valve system in which the magnitude of the electric field across the ferroelectric liquid crystal material is changed only in one directions, leaving the magnitude of the electric field in the other direction unchanged. In such a system, voltage controller would function to rotate only one of the second and the third directions of polarization, leaving the other uncontrolled.

The voltage controller may operated in response to a user input 72. The user input may be as simple as a manually controlled variable resistor in series with stable voltage source. Alternatively, the user input may be any number of analog or digital user inputs known in the art for adjusting a voltage level. The user input may be a fixed mechanical input or part of a graphical user interface that can change as needed. For purposes of this description, the user input 72 is any input provided by a user of the light valve system which is used to control a voltage level that affects the magnitude of an electric field across the ferroelectric liquid crystal material in at least one of a forward and a reverse direction.

The light valve system according to the invention may further comprise a light intensity sensor 74 and a feedback circuit 76. The feedback circuit is in electrical communication with the light intensity sensor and the voltage controller 66. The light intensity sensor is preferably located past the analyzer 18 along an optical path 78 traveled by the light entering through the light input 62. The light intensity sensor 74 can be any type of light intensity sensor known in the art including, but not limited to, photo-diodes and photo-resisters. The light intensity sensor is preferably configured to detect the intensity of the light having the second direction of polarization that is transmitted through the analyzer rather than being absorbed, or dark state luminance. Ensuring the light intensity sensor is illuminated by dark state luminance can be done in a number of ways. For example, it can be positioned so that it is illuminated by pixels that are permanently in the second pixel condition, with light exiting the pixel having the second direction of polarization. These pixels can be controlled by the signal processing electronic 52 or can have a pixel electrode that is "hard wired" to one of the first voltage level or the second voltage level. Alternatively, the signal processing electronics can make all of the pixels in the array of pixels simultaneously "flash" the to the second pixel condition during which flash the light intensity sensor 74 is activated. This flashing can be done repeatedly and automatically in any number of ways. For example, it can be done once upon startup, and then several times during warmup and then not again or it can be done periodically throughout the operation of the light valve system.

Figure 10:
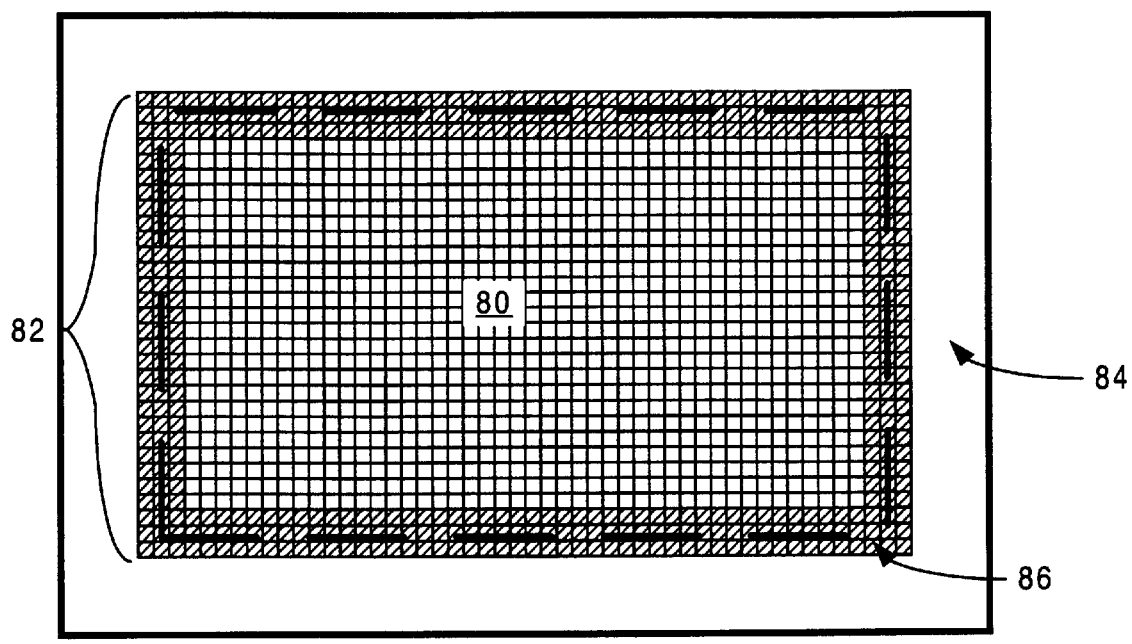
FIG. 10 is a rear view of a prior art projection screen depicting the light from an array of pixels with perimeter pixels in a 0 state.

In one embodiment, pixels used to define and adjust a border are used to illuminate the light intensity sensor 74. FIG. 10 depicts a prior art rear projection screen 80 onto which light 82 exiting the array of pixels (not shown) and passing through the analyzer (not shown) is projected by the imaging optics (not shown). The side of the screen onto which the light is projected is shown and a user would normally view the projected light 82 from the opposite side of the screen (not shown). A screen bezel 84 located between the border of the screen and the user defines the viewable area of the screen The signal processing electronics switch the a number of the "border pixels" to the second pixel state to project a frame 86 (indicated by hash-marks) in the projected light.

The frame is used in prior art light valves to allow for some misalignment of the projected light 82 with the viewable area of the screen 80. Thus, the image projected on the screen can be moved by widening the frame on one side while narrowing the frame on the opposite side. For example, the image can be moved left by increasing the number of pixels making up the width of the frame on the right side of the image while simultaneously decreasing the number of pixels making up the width of the frame on the left side of the image. The frame can also be used to provide fine control over the height and width of the image viewed.

Figure 11:
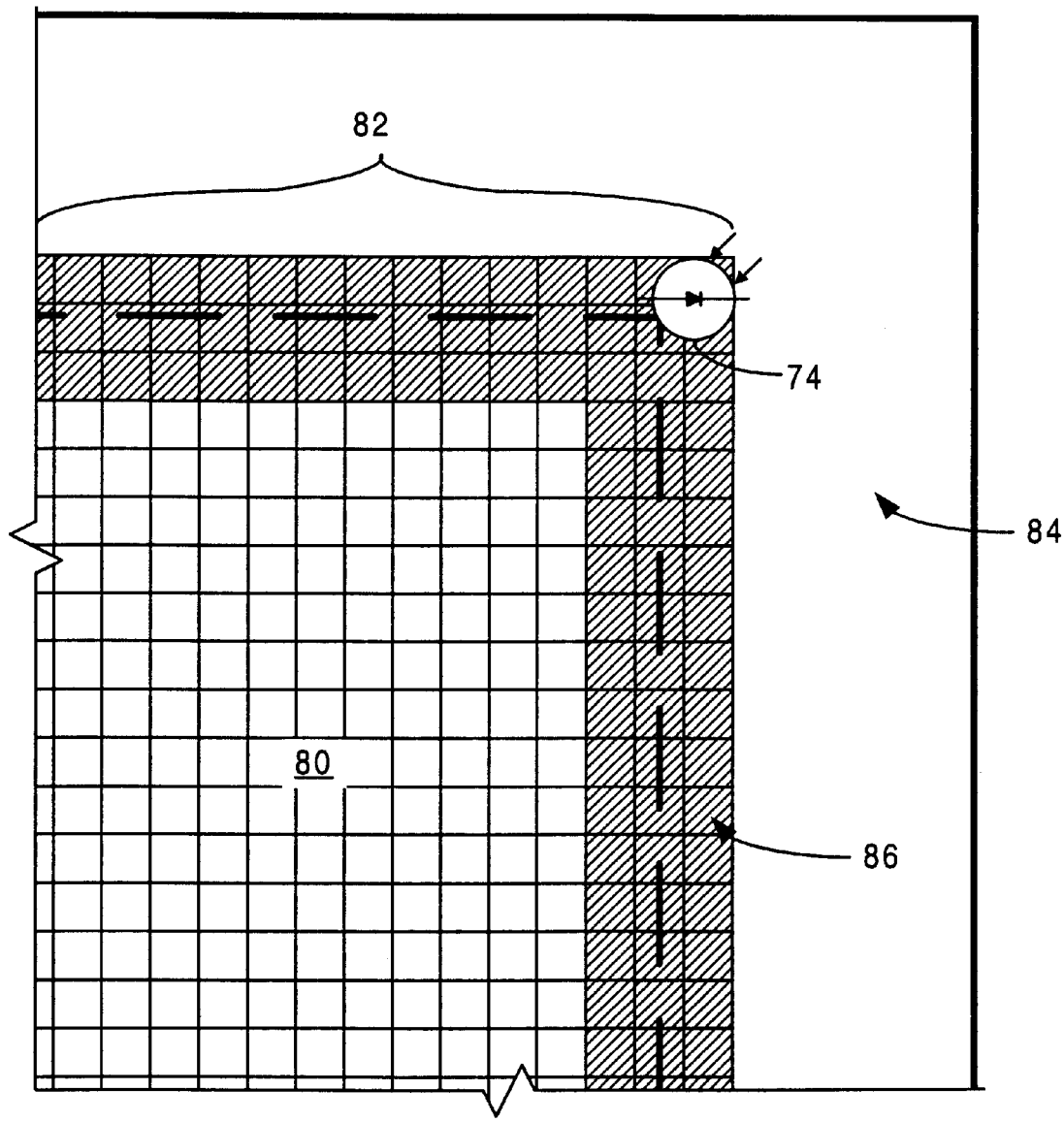
FIG. 11 is a light intensity sensor positioned to be illuminated by pixels in the 0 state according to the invention.

FIG. 11 shows a portion of the screen 80 and projected light 82 as in FIG. 10 adapted to be used with a light intensity sensor 74 according to the invention. The light intensity sensor 74 is placed against the screen in one embodiment of the invention so that it is illuminated by the light of the frame, but is located within the area of the screen 80 covered by the bezel 84 so that any shadow cast by the light intensity sensor is not visible to a viewer. One type of suitable light intensity sensor is a UDT-604 manufactured by UDT Sensors, Inc. The UDT has an overall diameter of 5.3 mm, and the area of the active surface is 0.8 $mm^2$. This device incorporates an integrated transresistance amplifier, and so provides a voltage output substantially proportional to the light flux absorbed by the active area. Alternatively, a light intensity sensor may be selected that is small enough or transparent enough so that its affect on the light seen by the view is minimized.

Figure 12:
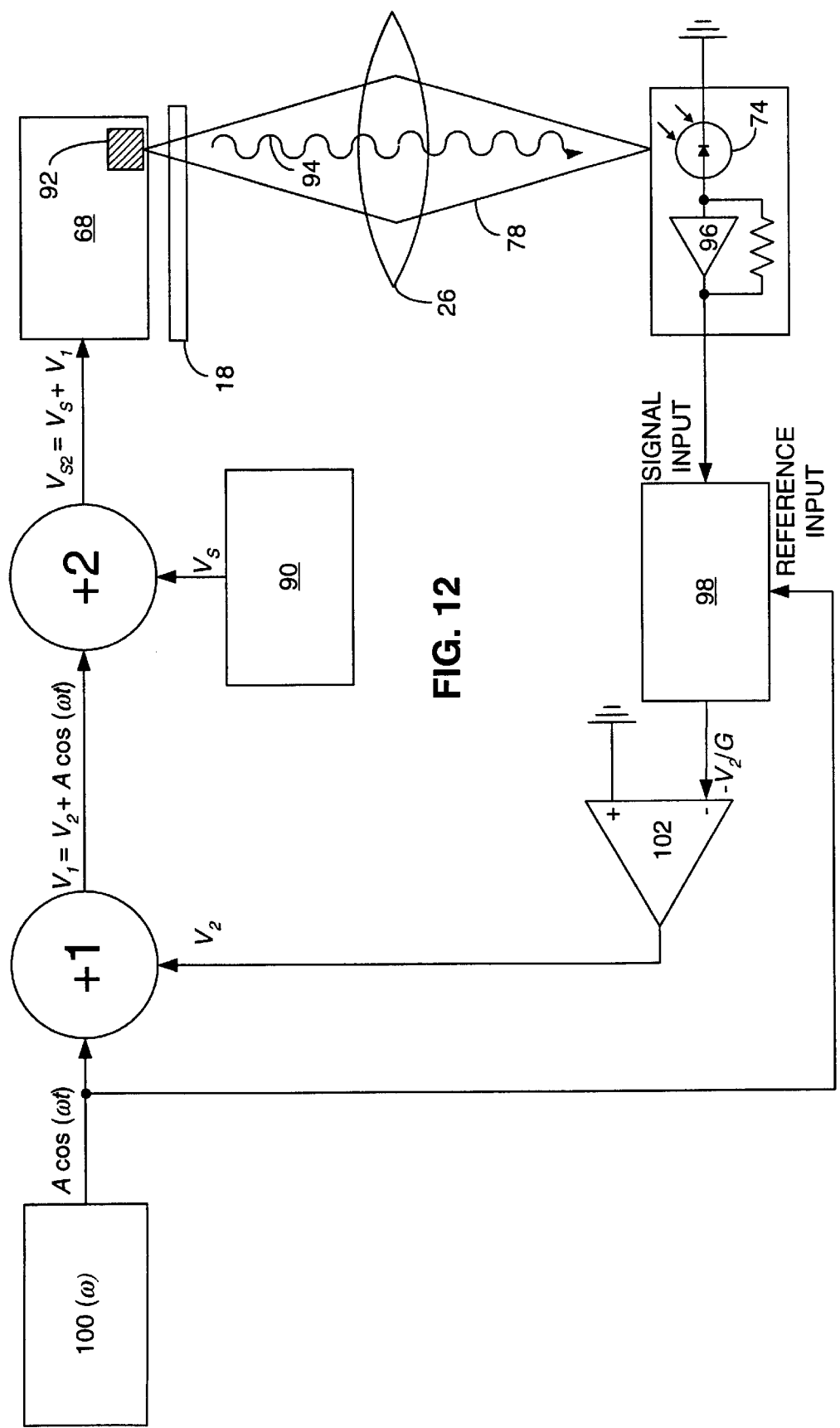
FIG. 12 is a schematic view of a automatic contrast control feedback circuit according to the invention.

FIG. 12 is a schematic diagram of the overall operation of a feedback circuit 76 designed to maximize contrast by minimizing the intensity of light having the second direction of polarization detected by the light intensity sensor 74. For purposes of this description, it is assumed that the array of pixels 68 are driven with a circuit like that shown in FIG. 9. Thus, a single variable input voltage level ($V_{S2}$) controls the magnitude of the electric field across the ferroelectric liquid crystal material in both the forward and reverse directions. It is also assumed that the variable input voltage level ($V_{S2}$) is the sum of a steady state voltage ($V_S$) from a voltage supply 90 and a correction voltage ($V_1$). The steady state voltage ($V_S$) is selected to provide reasonable contrast across all temperatures as is known in the art. The correction voltage ($V_1$) is calculated based on the intensity of light 94 exiting pixels in the second pixel condition (the 0 state) 92 having the second direction of polarization that is received at the light intensity sensor 74 after passing through the analyzer 18.

This intensity of this light 94 falling on the light intensity sensor 74 generates a photo-current that is amplified by amplifier 96. The amplified signal is then supplied as an input signal to a lock-in amplifier 98 such as an EG&G Princeton Applied Research Model 5209. A reference signal is also supplied to the lock-in amplifier. The reference signal is taken from the output of an oscillator 100 having frequency $\omega$. The output of the oscillator would thus be $A\cos(\omega t)$ where A is the amplitude of the output typically in the range of between 1 and 100 millivolts and t is time in seconds. The output of the reference amplifier is then fed into an operational amplifier 102 which has a gain (G) on the order of $10^4$ or greater. The operational amplifier 102 output ($V_2$) is then fed into a first summing amplifier (+1) along with the output of the oscillator 100. The first summing amplifier (+1) output ($V_1$) thus becomes $V_2+A\cos(\omega t)$. The output ($V_2$) of the first summing amplifier is fed into a second summing amplifier (+2) along with the voltage supply 90 output ($V_S$). The second summing amplifier (+2) output ($V_{S2}$) thus becomes $V_1+V_S$.

For purposes of this figure, the feedback circuit 76 includes the lock-in amplifier 98, oscillator 100, operational amplifier 102, and the first summing amplifier (+1). The voltage controller 66 includes, the voltage supply 90 and the second summing amplifier (+2).

In the feedback circuit depicted in FIG. 12, the intensity of the light at the light intensity sensor 74 can be calculated based on the equation: $D=k(V_1-V_0)^2+D_0$. In the equation D is the intensity of light at the light intensity sensor (in Watts/meter$^2$), k is a constant, $V_1$ is the correction voltage $V_0$ is the correction voltage when the intensity of light is minimized, and $D_0$ is that minimized intensity. $D_0$ and $V_0$ would occur when the analyzer 18 blocks virtually all the light having the second direction of polarization. Since $V_1$ is the output of the first summing amplifier (+1) and is equal to $V_2+A\cos(\omega t)$, this can be substituted into the equation for D as follows:

$$D = \left((k(V_2-V_0))^2 + D_0 + \frac{k^2A^2}{2}\right) + 2k(V_2-V_0)A\cos\omega t + \frac{k^2A^2\cos 2\omega t}{2}$$

Thus, D consists of three components: a constant term, a component with an angular frequency $\omega$ and a component with an angular frequency $2\omega$. The component with angular frequency $\omega$ has an amplitude $2k(V_2-V_0)A$. Thus, when $V_2 = V_0$, the amplitude of this component is zero. The corresponding value of $V_1$ is then $V_0+A\cos\omega t$. If A is sufficiently small, the effect of the sinusoidal variation in intensity will be invisible, and then, for all practical purposes, $V_1=V_0$ and the contrast ratio is optimized.

Figure 13:
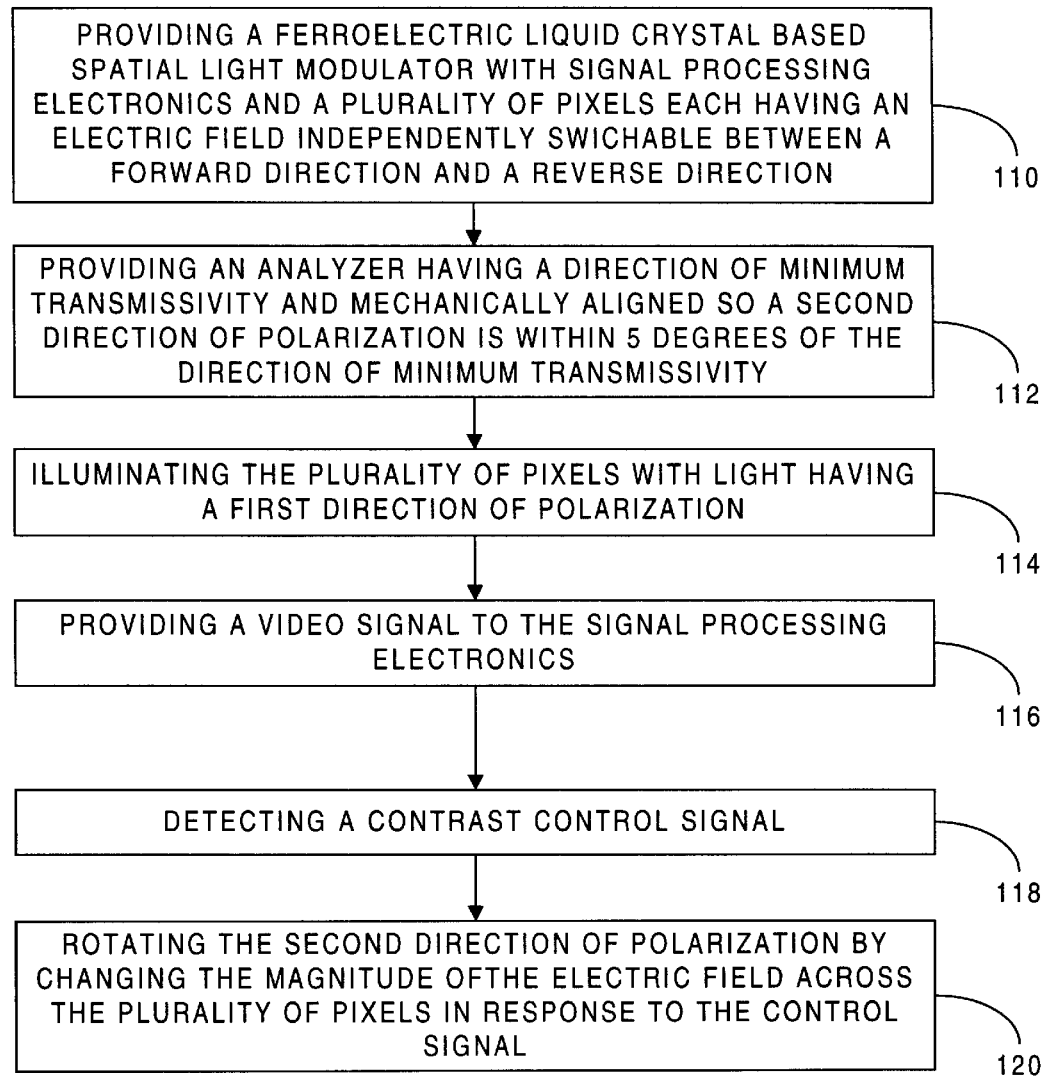
FIG. 13 is a flow chart depicting the method according to the invention.

FIG. 13 is a flowchart depicting the method of contrast control in a ferroelectric liquid crystal-based light valve system according to the invention. The method begins by providing a ferroelectric liquid crystal-based spatial light modulator 64 (block 110) that includes a plurality of pixels 68 and signal processing electronics 52. The signal processing electronics independently switch an electric field across each of the plurality of pixels between a forward direction and a reverse direction.

Next, an analyzer 18 is provided (block 112) that has a direction of minimum transmissivity. The analyzer is mechanically aligned with the ferroelectric spatial light modulator. The alignment is such that when the plurality of pixels is illuminated by light having a first direction of polarization, the light exiting those of the pixels having an electric field with a direction that is one of either forward or reverse has a second direction of polarization that is aligned within 5 degrees of the direction of minimum transmissivity.

The plurality of pixels are then illuminated (block 114) with light having the first direction of polarization. The light may come from a polarized light source (not shown) or from light passing through a polarizer 14. The illumination may also be direct or indirect via a mirror or beam splitter.

Next a video signal 40 is provided (block 116) to the signal processing electronics 52. The video signal usually includes both picture data and a sync pulse. The signal processing electronics use the video signal to determine switching timing and electric field direction for each of the plurality of pixels in order to reproduce the picture data. Since a frame may also be produced by the plurality of pixels, only a majority of the pixel electrodes may be actively switched by the signal processing electronics to display the image.

Next, a contrast control signal is detected (block 118). Detecting the control signal may include checking for an input from a contrast control user interface 72. Detecting the control signal may also include providing an automatic contrast control feedback circuit 76. If provided, the feedback circuit may include a light intensity sensor 74 configured to detect the intensity of light exiting at least one of the plurality of pixels and transmitted through the analyzer 18.

Detecting the control signal may also include switching the at least one of the plurality of pixels configured to illuminate the light intensity sensor to one of the forward direction and the reverse direction electric field so the direction of polarization of light exiting the at least one of the plurality of pixels is aligned within 5 degrees of the direction of minimum transmissivity. Alternatively, the majority of the pixels may be uniformly switched or "flashed" to one of the forward electric field and the reverse electric field so the direction of polarization of light exiting all the pixels is aligned within 5 degrees of the direction of minimum transmissivity. The intensity of light passing through the analyzer is then detected with the light intensity detector during the flash.

The second direction of polarization is then rotated (block 120) by changing the magnitude of the electric field across the plurality of pixels in response to the control signal. The direction of polarization of the light exiting the plurality of pixels may be rotated until the intensity of light received by the light intensity sensor is minimized using the feedback circuit depicted in FIG. 12 as previously discussed. Alternatively, the direction of polarization of the light exiting the plurality of pixels can be rotated until the direction of polarization of the light exiting the plurality of pixels having one of a forward direction electric field and a reverse direction electric field is parallel to the direction of minimum transmissivity. One other alternative is to rotate the second direction of polarization in response to the control signals received by the contrast control user interface.

Figure 4:
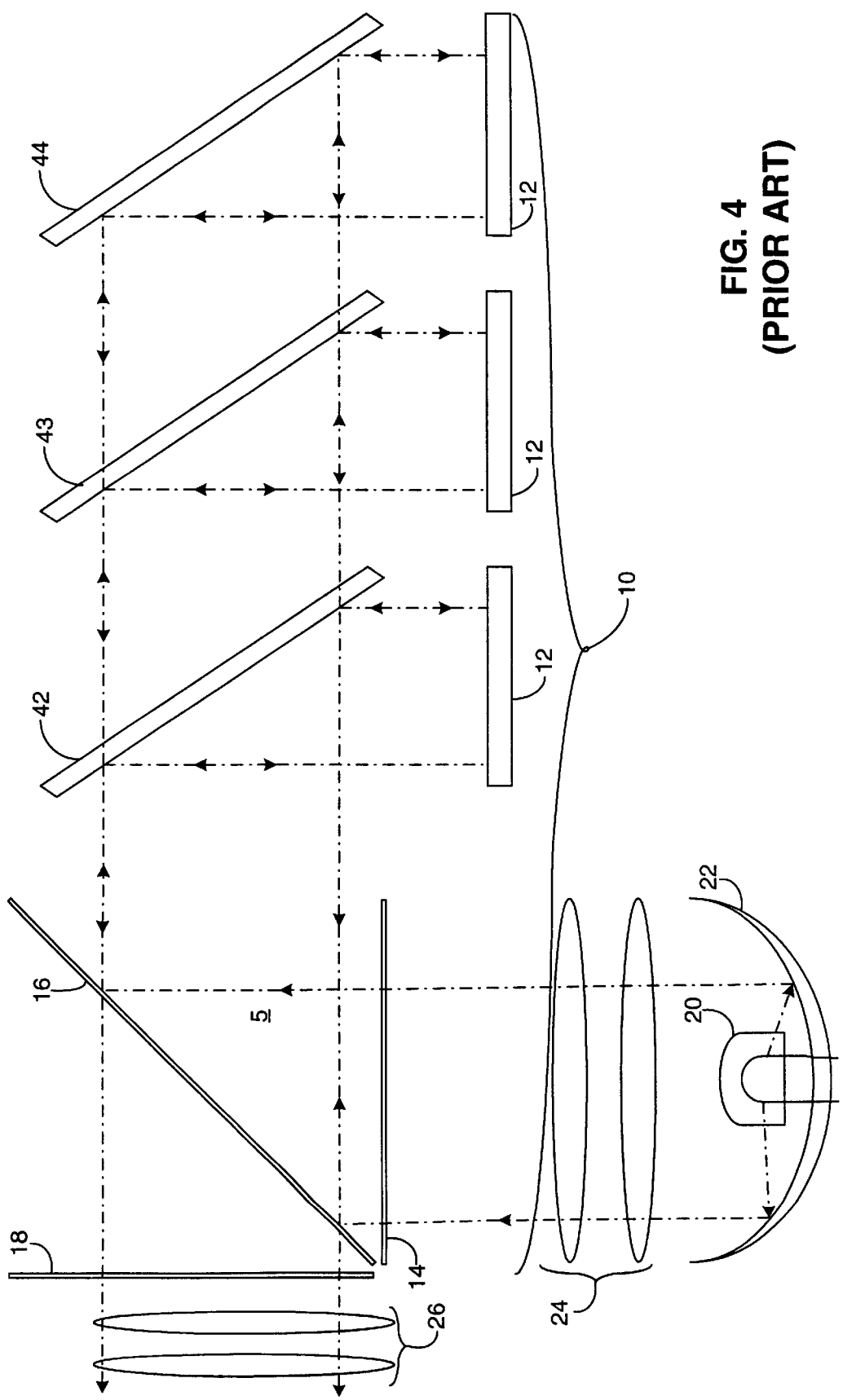
FIG. 4 is a schematic diagram of part of a prior art display device incorporating a conventional reflective light valve with three spatial light modulators and three dichroic plates.
Figure 5:
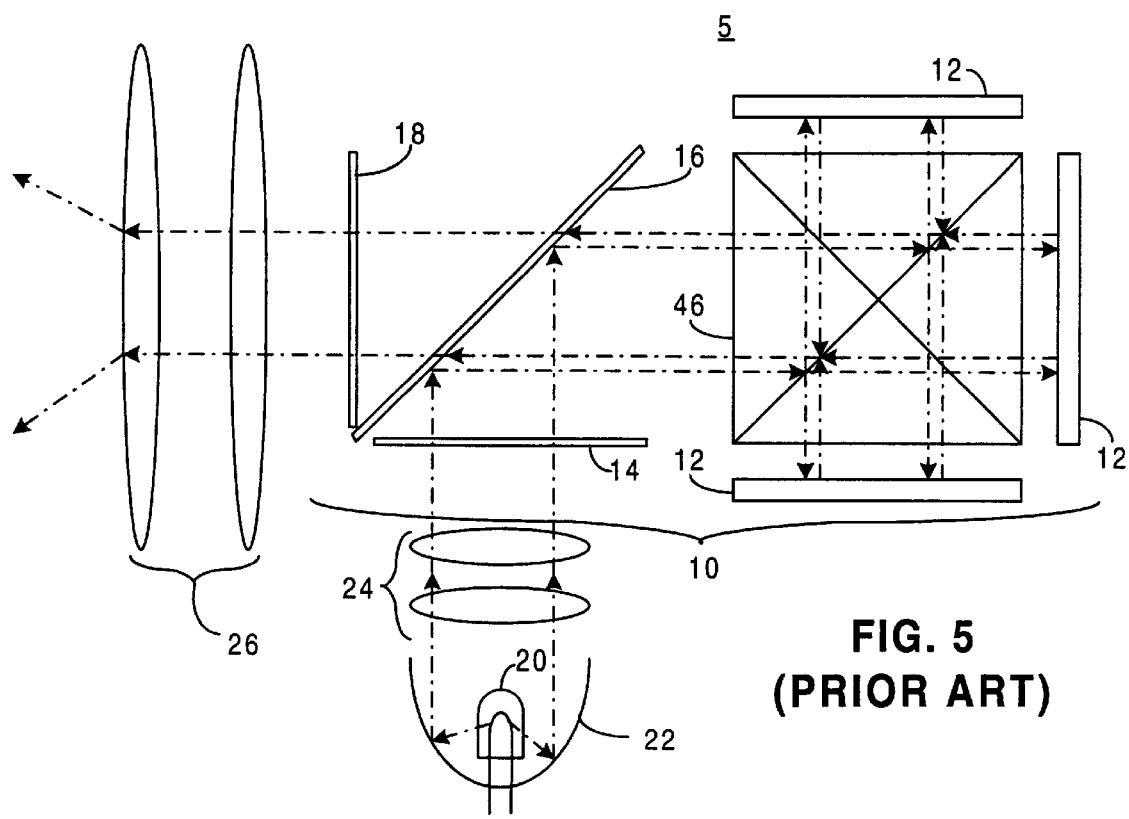
FIG. 5 is a schematic diagram of part of a prior art display device incorporating a conventional reflective light valve with three spatial light modulators and a color separation cube.
Figure 6:
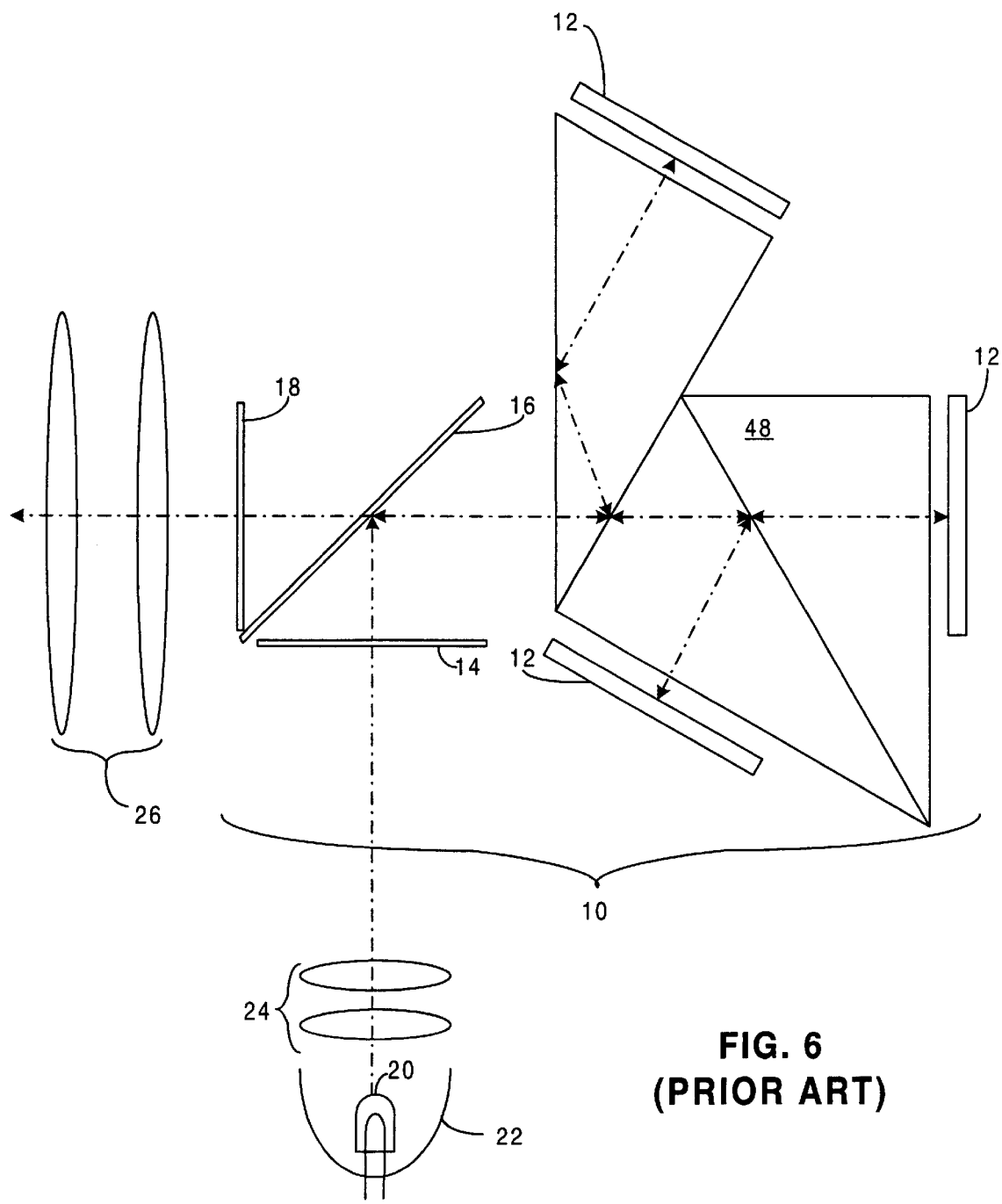
FIG. 6 is a schematic diagram of part of a prior art display device incorporating a conventional reflective light valve with three spatial light modulators and a three-prism color separator.
Figure 7A:
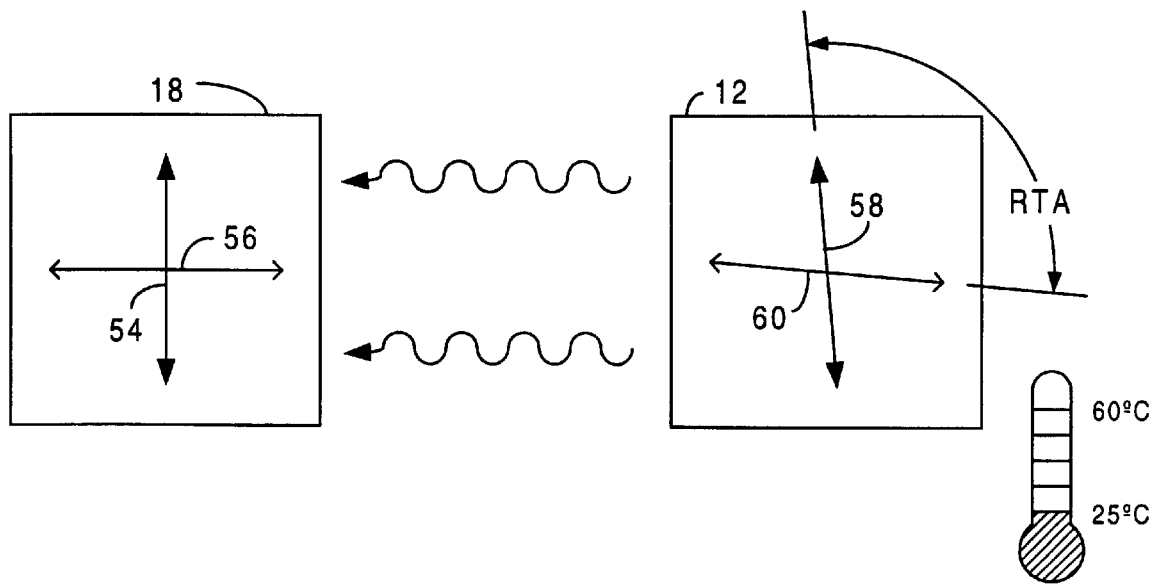
FIG. 7A is a schematic diagram depicting alignment of a spatial light modulator with an analyzer from a prior art display device at room temperature.
Figure 7B:
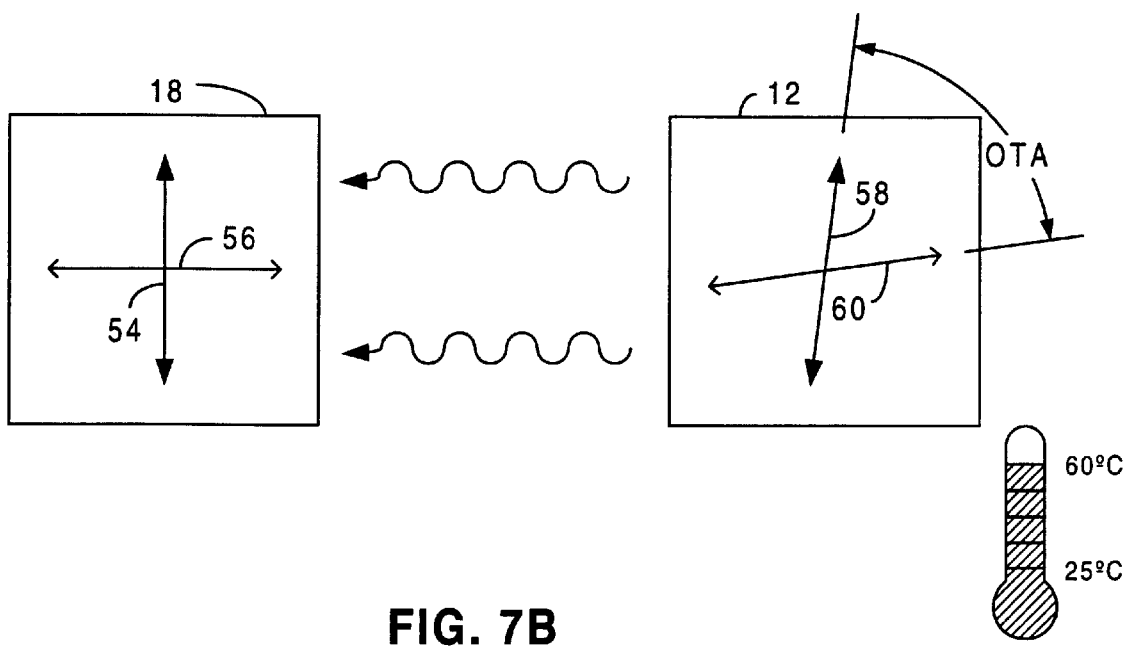
FIG. 7B is a schematic diagram depicting alignment of a spatial light modulator with an analyzer from a prior art display device at operating temperature.

While both the embodiments of the invention described in detail above refer to a light valve system including a single spatial light modulator 12 as shown in FIG. 8. The invention can be used equally well with a multiple light valve system like those shown in FIGS. 4 though 6.

Although this disclosure describes illustrative embodiments of the invention in detail, it is to be understood that the invention is not limited to the precise embodiments described, and that various modifications may be practiced within the scope of the invention defined by the appended claims.

We claim:

1. A liquid crystal-based light valve system with contrast control, the light valve system comprising:
    a light input, through which light having a first direction of polarization is received;
    a ferroelectric liquid-crystal-based spatial light modulator including signal processing electronics and array of pixels, the array of pixels configured to receive light from the light input and including:
        an array of pixel electrodes, each pixel electrode defining the location of one pixel in the array of pixels and independently switchable by the signal processing electronics between a first voltage level corresponding to a first pixel condition, in which light exiting the pixel has a second direction of polarization, and a second voltage level corresponding to a second pixel condition, in which light exiting the pixel has a third direction of polarization that is within 5 degrees of orthogonal to the second direction of polarization, a transparent electrode Fat a third voltage level between the first voltage level and the second voltage level and a layer of ferroelectric liquid crystal material sandwiched between the transparent electrode and the array of pixel electrodes;

an analyzer having orthogonal directions of maximum transmissivity and minimum transmnissivity, the analyzer positioned to receive the light exiting the array of pixels and aligned with:

the direction of minimum transmissivity within 5 degrees of the second direction of polarization, and the direction of maximum transmissivity within 5 degrees of the third direction of polarization; and a voltage controller configured to adjust at least one of the first voltage level and the second voltage level through a first range of voltages and a second range of voltages, respectively.

2. The light valve system of claim 1, in which the signal processing electronics have an input voltage level equal to one of the first voltage level and the second voltage level.

3. The light valve system of claim 1, in which the signal processing electronics have an input voltage level unaffected by the voltage controller.

4. The light valve system of claim 1, in which the voltage controller operates in response to a user input.

5. The light valve system of claim 1, additionally comprising:

a light intensity sensor configured to detect the intensity of the light having the second direction of polarization transmitted through the analyzer; and a feedback circuit in electrically communication with the light intensity sensor and the voltage controller.

6. The light valve system of claim 5, in which the feedback circuit is configured to automatically minimize the light having the second direction of polarization illuminating the light intensity sensor.

7. The light valve system of claim 1, in which the third voltage level is substantially equal to half the difference between the first voltage level and the second voltage level.

8. The light valve system of claim 7, in which one of the first voltage level and the second voltage level is ground.

9. The light valve system of claim 8, in which the other of the first voltage level and the second voltage level is equal to a variable input voltage level and one of the first range of voltages and the second range of voltages is a variable input range of voltages.

10. The light valve system of claim 9, in which at least one of the second direction of polarization and the third direction of polarization rotates by at least 2 degrees as the voltage controller adjusts the variable input voltage level though the variable input range of voltages.

11. A method of controlling contrast in a ferroelectric light valve system, the method comprising:

a) providing a ferroelectric liquid crystal-based spatial light modulator including a plurality of pixels and signal processing electronics for independently switching an electric field across each of the plurality of pixels between a forward direction and a reverse direction;

b) providing an analyzer having a direction of minimum transmissivity, the analyzer mechanically aligned with the ferroelectric spatial light modulator so that when the plurality of pixels is illuminated by light having a first direction of polarization, the light exiting those of the plurality of pixels with an electric field switched to one of the forward direction and the reverse direction has a second direction of polarization that is aligned with 5 degrees of the direction of minimum transmissivity;

c) illuminating the plurality of pixels with light having the first direction of polarization;

d) providing a video signal to the signal processing electronics;

e) switching the electric field across a majority of the plurality of pixels independently between the forward direction and the reverse direction in response to the video signal;

f) detecting a contrast control signal; and g) rotating the second direction of polarization by changing the magnitude of the electric field across the plurality of pixels in response to the control signal.

12. The method of claim 11, in which step (f) includes checking for an input from a contrast control user interface.

13. The method of claim 11, in which step (f) includes providing an automatic contrast control feedback circuit.

14. The method of claim 13, in which providing the automatic contrast control feedback circuit providing in step (f) includes providing a light intensity sensor configured to detecting the intensity of light exiting at least one of the plurality of pixels and transmitted through the analyzer.

15. The method of claim 14, in which step (f) additionally includes switching the at least one of the plurality of pixels to one of the forward direction and the reverse direction electric field so the direction of polarization of light exiting the at least one of the plurality of pixels is aligned within 5 degrees of the direction of minimum transmissivity.

16. The method of claim 15, in which step (g) includes rotating the direction of polarization of the light exiting the plurality of pixels until intensity of light received by the light intensity sensor is minimized.

17. The method of claim 14, in which step (f) additionally includes periodically switching the majority of the pixels uniformly to one of the forward electric field and the reverse electric field and then detecting the intensity of light at the light intensity sensor.

18. The method of claim 14, in which step (f) additionally includes switching the majority of the pixels uniformly to one of the forward electric field and the reverse electric field once and then detecting the intensity of light at the light intensity sensor.

19. The method of claim 11, in which step (h) includes rotating the direction of polarization of the light exiting the plurality of pixels until the direction of polarization of the light exiting the plurality of pixels having one of a forward direction electric field and a reverse direction electric field is parallel to the direction of minimum transmissivity.

* * * * *

UNITED STATES PATENT AND TRADEMARK OFFICE
CERTIFICATE OF CORRECTION

PATENT NO. : 6,519,012 B1
DATED : February 11, 2003
INVENTOR(S) : Rene P. Helbing et al.

It is certified that error appears in the above-identified patent and that said Letters Patent is hereby corrected as shown below:

<u>Column 19,</u>
Line 10, delete "Fat" and insert therefor -- at --

Signed and Sealed this

Twenty-ninth Day of June, 2004

JON W. DUDAS
*Acting Director of the United States Patent and Trademark Office*